Aug. 14, 1945. W. G. BILLÉ 2,382,393
WAVE DAMPING DEVICE
Filed Aug. 8, 1942
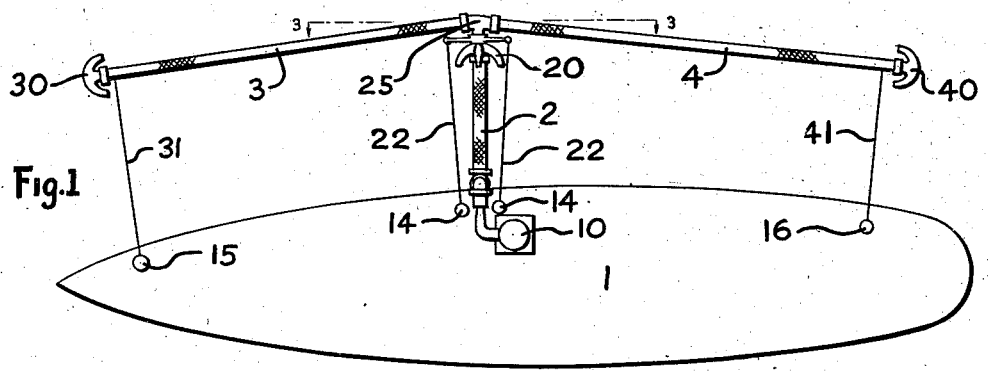
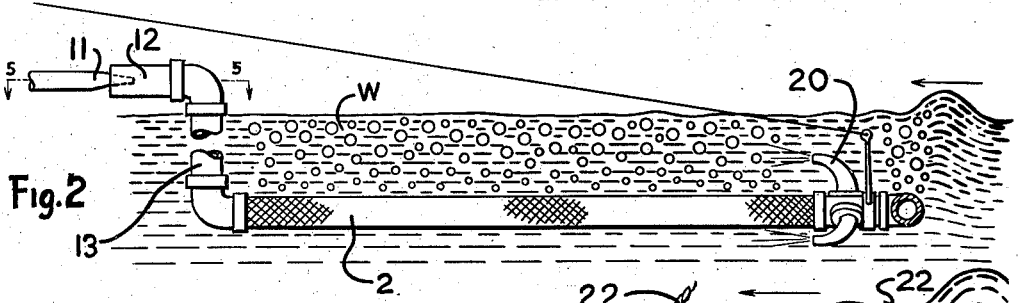
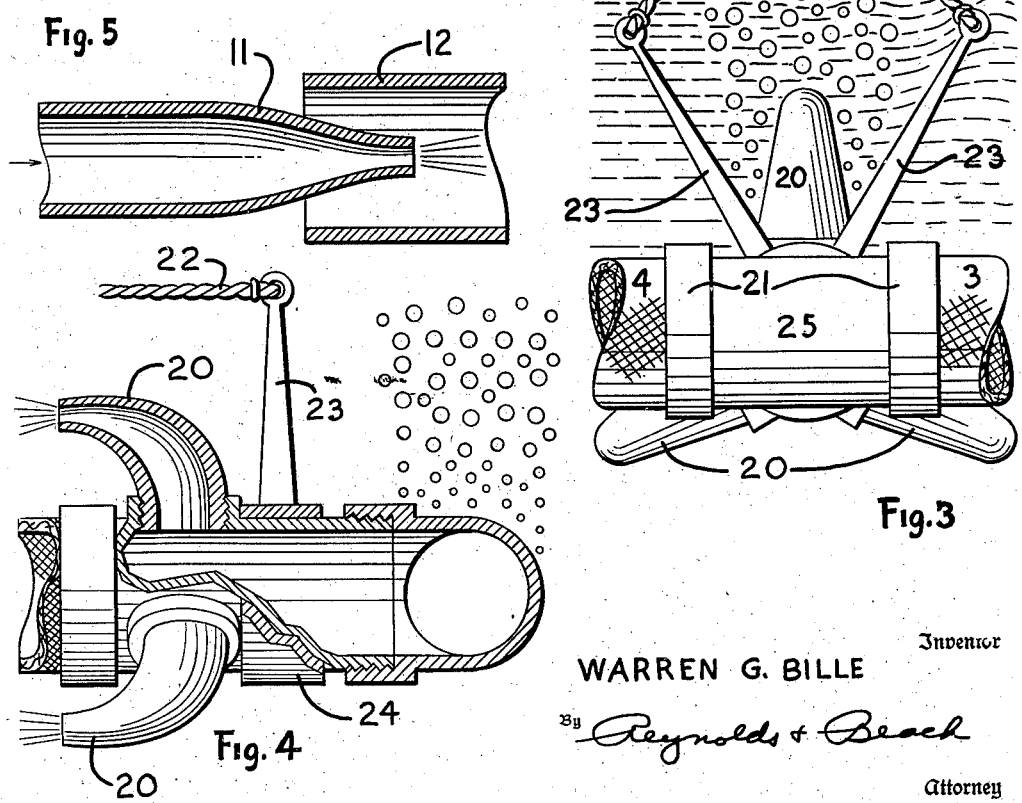
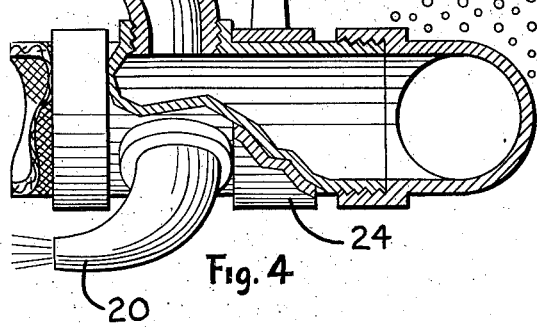
Inventor
WARREN G. BILLE
By Reynolds & Beach
Attorney Patented Aug. 14, 1945

2,382,393

UNITED STATES PATENT OFFICE 2,382,393

WAVE DAMPING DEVICE

Warren G. Billé, Seattle, Wash.

Application August 8, 1942, Serial No. 454,197

18 Claims. (Cl. 61—6)

Wave quieting or damping devices employing the principle of discharging air upward from beneath the surface of water have been proposed heretofore, as shown in Brasher Patents Nos. 843,926 and 1,593,863, for example. Such devices have not been capable of use, however, in many instances where they would have been of the utmost value, because the equipment available has been heavy, cumbersome, and immobile. The air has been discharged at the location required from perforated metal pipe, which must be suitably supported from the bed of the ocean, river, or other body of water. To make such an installation under water is a difficult task requiring much time, and after placement the pipe can be relocated only by repeating the same procedure. A construction of the Brasher type, therefore, is necessarily limited to permanent installations, that is, installations with are intended to be utilized in fixed locations for long periods of time.

My invention relates particularly to highly mobile equipment for discharging air or other gas under water, which equipment may be transported easily from place to place, and may be set up quickly for operation at any given location. Furthermore, the pattern of air bubble columns which it generates may be changed readily to alter the shape and size of the calmed area, as the particular requirements of the situation may dictate.

A principal novel characteristic of my equipment is the use of special flexible hose in place of rigid metal pipe, and the manner in which this flexible hose conducts and discharges gas. A further principal feature is the expedient for establishing and controlling the location of such hose despite its flexibility.

In order to extend the hose outward from a control station, reaction nozzles are mounted on the free end of the hose remote from its anchored end. As water is discharged from these nozzles directed toward the control station, the force of reaction draws the hose outward until it is taut. Several nozzles may be arranged symmetrically about such free hose end, so that no eccentric or unbalanced force tending to swing the hose will be created. Control lines secured to the hose adjacent to the reaction nozzle head and extending to the control station, may be manipulated manually to deflect the hose to one side or the other, or to raise or lower it.

If the reaction nozzles are to be effective for their intended purpose a large volume of water must be discharged from them. This water will be supplied from the control station and flow through the hose to the nozzles, but in order to insure that sufficient volume to be effective reaches the nozzles the hose should be watertight or substantially so. Along the length of the hose, however, gas must be allowed to escape to effect the wave damping operation. The hose, therefore, is made of canvas, which, even when its fibers are soaked up, is sufficiently porous to permit gas to exude readily through its wall, but an amount of water leakage sufficient to impair the effectiveness of the reaction nozzles appreciably should not occur.

When a mixture of gas and water is passed into this hose, the gas will escape through its walls along its length and bubble upward to the surface of the water in which the hose is laid. The water within the hose, on the other hand, which cannot escape readily, will, for the most part, flow through it to its end remote from the control station, from which the water will be discharged through the reaction nozzles to extend the hose. The gas and water mixture may be produced in different ways, conveniently by an injector mechanism composed of a nozzle injecting water into the end of a pipe communicating with a gas supply. This source may merely be the atmosphere, or may be air or other gas under pressure, such as a pressure tank or a blower.

The injector will propel the water with considerable force into the hose, and the turbulence will be sufficiently great to mix the gas intimately with it. Even if air is supplied only under atmospheric pressure the injected water will serve as a vehicle for the air intermingled with it in order to be released fairly uniformly along the length of the hose, instead of most of the air being liberated from that portion nearest the control station. The longer the hose is, of course, the greater must be the water pressure, but it need not be as great if the air or other gas is supplied under pressure.

Various hose arrangements may be employed to release the gas in the pattern which would be most effective in calming the particular area desired. My system is highly flexible, so that the pattern can be altered readily by manipulation from the control station.

The arrangement which I have shown in the drawing, while illustrating the principle upon which my system operates, is merely exemplary. A variety of arrangements employing the same principle may be devised, depending upon the particular requirements of each installation.

Figure 1 shows in plan a representative system controlled from a ship. Figure 2 is a vertical elevation view of a principal element of my device, other elements having been broken away.

Figure 3 is an enlarged end elevation view of one portion of the system as seen from line 3—3 of Figure 1. Figure 4 is a side elevation view of the same mechanism, with parts broken away.

Figure 5 is a vertical section of the injector, taken along line 5—5 of Figure 2.

The important operating features of my system include supplying a mixture of gas and water to a flexible conduit, releasing the gas from the mixture substantially uniformly along the length of the conduit, to produce the wave quelling action, and delivering the water principally to the remote end of the conduit for discharge through reaction nozzles, to exert a force for extending the flexible conduit to its full length. The conduit, therefore, is preferably canvas hose, which, when its fibers are soaked up, is substantially impervious to water but is sufficiently porous to afford only small resistance to the passage of gas outwardly through its walls. Moreover, such hose is highly flexible, so that it can be rolled up and stored in small space when not in use, and which, when carrying water, can be deflected, bent, or manipulated with ease.

These features obviously may be embodied in installations of different types, but are particularly valuable for systems required to be effective over a wide area, but which may be used infrequently. Such a system must be capable of being set up for action quickly, but collapsible for storage in small space when not in use.

Such characteristics make my system well suited for laying from a ship. In the arrangement of Figure 1 a hose 2, located substantially amidships, projects laterally from the ship 1. In order to quiet the water alongside the ship additional hoses 3 and 4 extend forward and aft, respectively, from the outer end of hose 2. By this arrangement a calm area of considerable width between the ship and hose lines 3 and 4 may be created, which would greatly facilitate rescue work or enable lifeboats to be launched safely in rough weather. Such a calmed area would also be advantageous when servicing seaplanes, flying boats, or submarines, or preparatory to hoisting small boats or airplanes to the ship's deck.

While all of conduits 2, 3 and 4 have been represented as of flexible, porous hose, conduit 2 might be impervious even to gas, for example a rubber-lined or rubber hose, which nevertheless is flexible, or in some instances it might even be of rigid, imperforate metal pipe. It is preferable that this conduit be flexible, however, because if rigid it would be more difficult to place and support in operative position, and would occupy more storage space on shipboard. In the latter case no force would be required to extend it to its full length, such as created by reaction nozzles 20. Omission of these would conserve water for discharge through nozzles 30 and 40 at the ends of hoses 3 and 4, respectively.

The ship 1 or other control station carries a water pump 10 which discharges water under pressure through an injection nozzle 11 into conduit 12. This is the conduit for supplying the gas and water mixture to the entire system. If only air at atmospheric pressure is available it will enter the annular space in the end of conduit 12 surrounding nozzle 11. If the air or other gas is to be supplied under pressure, a blower discharge, pressure tank, or other source would be connected to the end of pipe 12. The injector action will thoroughly mix the gas with the water, which mixture flows down beneath the surface of the body of water W through an upright, preferably rigid pipe 13 of a length to locate the end of hose 2 next the ship approximately at the most effective depth beneath the water surface.

If hose 2 is of canvas, substantially impervious to water but sufficiently porous for emission of gas, practically all the water will flow through its entire length to its end carrying reaction nozzles 20. For some purposes a single sheet of bubbles may be all that is required, in which case hoses 3 and 4 could be omitted and couplings 21 plugged or T 25 eliminated. In such event all the water flowing to the outer end of hose 2 would be discharged through nozzles 20, while substantially all the gas mixed with the water would exude fairly uniformly along the length of the hose. Uniformity of gas escape can be controlled by varying the quantity, or the velocity, or both, of the jet issuing from injector nozzle 11, as may prove necessary. It may even be preferable under some conditions to replace such nozzle with one having a different degree of restriction.

In addition it may be desirable to change the pressure at which the air or gas is supplied to the space surrounding the injector nozzle 11. These various factors can be properly related so that the air will be released uniformly along the length of the hose, and in the desired quantity to produce an adequate quieting effect on the waves.

Location of the hose is controlled by manipulation from the ship 1, or corresponding control station if the system is not projected from a ship. The quantity and velocity of the water discharged from nozzles 20 is not critical, so long as it is sufficient to extend hose 2 to its full length. The tendency of the force created by these reaction nozzles, if symmetrically arranged about the hose, is merely to stretch the hose straight, not only as viewed in plan but also to elevate its outer end above the bed of the body of water, so that it is unnecessary to support any part of the conduit statically. At least two nozzles 20 should be used, unless the nozzle be annular, and three nozzles spaced apart by angles of 120° affords a more stable arrangement. All the nozzles may be the same, but if the force which they create is not great as compared to the weight of the nozzle assembly, it may be desirable to apply a force in the upward direction somewhat greater than in other directions, to raise the free end of the hose generally to the level of its anchored end. To create such greater upward force the two lower nozzles 20, as shown in Figure 3, may be spaced apart slightly less than 120°, or be slightly larger than the upper nozzle. All these nozzles are preferably directed somewhat outwardly rather than precisely parallel to hose 2, to exert forces each having a component toward the hose as well as parallel to it, which improves the stability of the arrangement.

The reaction of the water discharged from nozzles 20 normally will extend hose 2 substantially straight outward from the lower end of pipe 13. Control of the location of the unconfined hose may be supplemented by lines 22, preferably cables, connected to horns 23 projecting divergently upward from the nozzle assembly. These may be carried by a band 24 encircling the nozzle fitting. From the horns the lines extend inwardly to the control station where the ends are adjustably secured. Each inner cable end may be wound about a capstan 14, as shown in Figure 1, so that the length of one cable may be adjusted independently of the other, as well as both cables being adjustable simultaneously.

If the left cable 22 in Figure 1 is pulled in slightly while the right cable is paid out equally the outer end of hose 2 will be deflected to the left, although it will remain at the same depth. Conversely, if the right cable is shortened slightly and the left cable let out equally the outer end of hose 2 will be deflected to the right. If both cables are drawn in equally the outer end of the hose will be raised, whereas if they are both lengthened the weight of the nozzle assembly will cause the outer end of the hose to sink somewhat, if the force created by nozzles 20 is not too great. Otherwise the volume of water delivered by pump 10 can be reduced somewhat, thereby decreasing such force to permit the outer end of hose 2 to sink the desired amount. Thus the direction and depth of the outer hose end may be readily moved universally by remote control from the ship or other control station.

Hoses 3 and 4 are similar to the preferred type of hose 2, as described above, the walls of both being relatively impervious to passage of water but relatively permeable by gas. Their reaction nozzle heads 30 and 40 are each shown as having two nozzles similar to nozzles 20, but they may have three or more such nozzles, whose action is to extend hoses 3 and 4, respectively, to their full lengths from the end of hose 2.

When used in an installation of the type shown in Figure 1 it will be desirable to have the line of hoses 3 and 4 conform generally to the contour of the side of the ship. For this reason the T 25 to which hoses 3 and 4 are connected may be slightly curved in plan, as shown in Figure 1. In addition a control cable 31 may be secured to the free end of hose 3, and another control cable 41 fastened to the free end of hose 4. These cables will be generally parallel to cables 22 extending inward to the ship. The forward cable 31 may be wound about a capstan 15 and the rear cable 41 about another capstan 16. By shortening either of these cables the free end of the respective hose 3 or 4 will be drawn inward toward the ship to a greater or less extent, and if the through portion of T 25 is straight and cables 31 and 41 are paid out sufficiently, the nozzles 30 and 40 will swing their respective hoses 3 and 4 outward until they are in alignment.

With hoses 2, 3, and 4 in operation in the positions shown, a sheet of bubbles will rise from each, and the gas exuding from hoses 3 and 4 will quiet waves moving inward toward the ship in the direction indicated by the arrow in Figure 2. The air escaping from hose 2 would subdue waves moving parallel with the ship's length, such as moving from bow to stern in the direction of the arrow in Figure 3.

When it is desired to retract the system shown in Figure 1 the pipe 13 may be raised aboard ship and hose 2 may or may not be disconnected from it. This hose may then be coiled, wound on a reel, or otherwise retracted, cables 31 and 34 being pulled in simultaneously to move hoses 3 and 4 toward the ship. These branch hoses may then be elevated and lashed alongside the ship for rapid placement when desired by unreeling hose 2 and paying out cables 31 and 41 simultaneously. Forcing water through the trunk hose for ejection from nozzles 20 will move the outer end of the hose away from the ship into operative position.

An alternative procedure involves drawing the free ends of hoses 3 and 4 to the side of the ship by taking up cables 31 and 41 before hose 2 is moved. The ends of these branch hoses are then lifted aboard one on either side of the central control station alongside capstans 14. As cables 22 are then pulled in, all three of hoses 2, 3, and 4 will simultaneously be coiled or wound upon separate reels at the central control station, until the nozzle head 20 is reached. In placing the system the reverse procedure would be followed, hoses 2, 3 and 4 being paid out simultaneously from their respective stored positions. Discharge of water from nozzles 20 would then extend hose 2 to its full length, simultaneously locating the roots of hoses 3 and 4. These latter hoses are extended from the trunk hose 2 by ejection of water from nozzles 30 and 40, while cables 31 and 41 are paid out until they are disposed in the locations desired. The same procedure will be followed, of course, whether the control station is located on a ship, as illustrated, on a lock, or merely on a beach such as for facilitating a lifeboat launching operation.

An alternative arrangement of flexible hoses could include one hose generally parallel to the side of the ship with two other hoses projecting laterally from the ship and connected by elbows one to each end of the first hose. Reaction nozzle heads in such case would be provided on each leg of each elbow, each head being directed along the hose connected to its elbow leg, to extend both lateral hoses away from the ship and the hose interconnecting them generally parallel to the ship. There would then be no free hose end, and the water and air mixture would be supplied to the anchored end of one or both lateral hoses. The entire area encompassed would thus be protected from waves coming from any direction. The disadvantage of such an arrangement is that the outer hose would be straight, which would lessen the width of the calmed area amidships if the side of the ship had any appreciable belly. By selecting an appropriate arrangement of hoses a slick of considerable extent and desired shape may thus be produced.

What I claim as my invention is:

1. A mobile wave damping device comprising a flexible hose submersible beneath the surface of the water, constructed for escape of gas therefrom along its length, means anchoring one end of said hose, and a reaction nozzle carried by the opposite end of the hose for discharge therefrom of fluid flowing through the hose, thereby to exert upon such hose end a force to extend the hose lengthwise.

2. A mobile wave damping device comprising a flexible hose submersible beneath the surface of the water, constructed for escape of gas therefrom along its length, means anchoring one end of said hose, a reaction nozzle carried by the opposite end of the hose for discharge therefrom of fluid flowing through the hose, thereby to exert upon such hose end a force to extend the hose lengthwise, and a line secured to the end of said hose adjacent to said reaction nozzle for manipulation to control the position of the free hose end transversely of the hose.

3. A mobile wave damping device comprising an imperforate conduit submersible beneath the surface of the water, the wall of said conduit being permeable by gas for exudation thereof from the conduit along its length, means for anchoring one end of said conduit, and a reaction nozzle at the opposite end of said conduit and directed backward along the conduit for creating a force by ejection of fluid therefrom to extend the conduit lengthwise from its anchored end.

4. A mobile wave damping device comprising an imperforate conduit submersible beneath the surface of the water for flow therethrough of a mixture of liquid and gas, the wall of said conduit being substantially impervious to liquid, but permeable by gas for exudation thereof from the conduit along its length, means for anchoring one end of said conduit, and a reaction nozzle at the opposite end of said conduit and directed toward the anchored conduit end for creating a force by ejection of liquid therefrom to extend the conduit lengthwise substantially straight from its anchored end.

5. A mobile wave damping device comprising a flexible, imperforate hose submersible beneath the surface of the water for flow therethrough of a mixture of water and gas, the wall of said hose being substantially impervious to water but permeable by gas for exudation thereof from the hose along its length, injector means projecting a jet of water into said hose, a supply of gas communicating with said injector means for forcing into said hose a mixture of gas and water, means for anchoring one end of said hose, and a reaction nozzle at the opposite hose end and directed backward along the hose, for creating a force by ejection of water therefrom to extend the hose lengthwise.

6. A mobile wave damping device comprising a flexible hose submersible beneath the surface of the water, means anchoring one end of said hose, a reaction nozzle carried by the opposite end of the hose for discharge therefrom or fluid flowing through the hose, thereby to exert upon such hose end a force to extend the hose lengthwise, two arms projecting laterally from the end of said hose adjacent to said reaction nozzle, one on each side of a vertical plane passing through the end of said hose carrying said nozzle, and a line connected to each arm for manipulation to control the position of the free hose end transversely of the hose.

7. A mobile wave damping device comprising a flexible hose submersible beneath the surface of the water, means anchoring one end of said hose, fluid discharge means at the opposite end of said hose operable to exert a pulling force thereon lengthwise of the hose, tending to straighten it from its anchored end, a branch hose extending generally transversely of said first hose and connected thereto adjacent to said fluid discharge means, and fluid discharge means at the end of said branch hose remote from its connection with said first hose and operable to exert a pulling force on such end of said branch hose, tending to straighten it from said first hose.

8. A mobile wave damping device comprising a flexible hose submersible beneath the surface of the water for flow therethrough of a mixture of water and air, the wall of said hose being substantially impervious to water but permeable by air for exudation thereof from the hose along its length, means for anchoring one end of said hose, such anchored hose end communicating with an air supply, injector means projecting a jet of water into said anchored hose end for forcing into it a mixture of air and water, a reaction nozzle carried by said hose remote from its anchored end and directed backward along the hose for creating a force by ejection of water therefrom to extend the hose lengthwise, a branch hose disposed transversely of said first hose, the wall thereof also being substantially impervious to water but permeable by air for exudation thereof from the branch hose along its length, and a reaction nozzle carried by said branch hose remote from its connection with said first hose, and directed backward along the branch hose for creating a force by ejection of water therefrom to extend the branch hose lengthwise in a direction generally transversely of said first hose.

9. A mobile wave damping device comprising a flexible hose submersible beneath the surface of the water, means anchoring one end of said hose, means operable to exert a force on the opposite end of said hose to extend the hose lengthwise, two branch hoses extending generally transversely of said first hose and connected thereto, means connected to the end of each branch hose remote from its connection with said first hose and operable to extend its branch hose lengthwise, and a line connected to the free end of each branch hose for manipulation to swing each of said branch hoses relative to said first hose.

10. A mobile wave damping device comprising a conduit submersible beneath the surface of the water, constructed for escape of gas therefrom along its length, means anchoring one end of said conduit, and fluid discharge means at the opposite end of said conduit operable to exert a pulling force thereon lengthwise of the conduit.

11. A mobile wave damping device comprising a flexible hose submersible beneath the surface of the water, constructed for escape of gas therefrom along its length, means anchoring one portion of said hose, means to supply a mixture of liquid and gas into said hose, and liquid discharge means remote from the anchored portion of said hose and operable to exert a pulling force on said hose lengthwise thereof tending to extend it from its anchored portion.

12. A mobile wave damping device comprising a conduit submersible beneath the surface of the water, constructed for escape of gas therefrom along its length, and means operable to supply a mixture of liquid and gas into said conduit whereby the liquid retards release of gas from the conduit to convey a portion of such gas through said conduit over a considerable distance before releasing it for escape from the conduit.

13. A mobile wave damping device comprising a fabric hose submersible beneath the surface of the water, the wall of such hose being permeable by air for exudation therefrom along its length, and jet means operable to project water into the hose to draw air into it and to mix with the water for retarding release of air from the hose to convey a portion of such air through said hose over a considerable distance before releasing it for exudation through the wall of the hose.

14. A mobile wave damping device, comprising a conduit submersible beneath the surface of the water, means anchoring one end of said conduit, a flexible hose constructed for escape of gas therefrom along its length, disposed transversely of said conduit, and connected thereto at a location remote from the anchored end of said conduit, fluid discharge means carried by said flexible hose at a location remote from its connection with said conduit, and means operable to supply fluid to said conduit for flow through said conduit, said hose, and said fluid discharge means to extend said hose lengthwise away from said conduit, and for discharge of gas from said hose along its length.

15. The method of damping waves on a body of water, which comprises projecting through a conduit beneath the surface of the water of such body a mixture of liquid and gas, and liberating gas from the conduit along its length for reducing the magnitude of waves in the vicinity where the gas is released, the liquid serving to retard release of gas from the conduit and to convey it through the conduit.

16. The method of damping waves on a body of water, which comprises projecting through a conduit beneath the surface of the water of such body a mixture of liquid and gas, liberating gas from the conduit along its length for reducing the magnitude of waves in the vicinity where the gas is released, and discharging liquid from the conduit in a direction generally opposite to that in which it flowed through the conduit for exerting a pulling force on the conduit lengthwise thereof.

17. The method of damping waves in a body of water, which comprises projecting a jet of water into a conduit disposed beneath the surface of the water of such body, and thereby drawing air into such conduit and forming an air and water mixture, liberating air along the length of the conduit for reducing the magnitude of the waves in the vicinity in which the air is liberated, and regulating the water jet to vary the water and air mixture flowing through the conduit.

18. The method of damping waves in a body of water, which comprises projecting a jet of water into a conduit disposed beneath the surface of the water of such body, and thereby drawing air into such conduit and forming an air and water mixture, liberating air along the length of the conduit for reducing the magnitude of the waves in the vicinity in which the air is liberated, discharging water from a portion of the conduit remote from the water jet in a direction generally opposite to the direction of flow of water through the conduit for exerting a pulling force on the conduit to extend it lengthwise, and regulating the water jet to vary the water and air mixture flowing through the conduit.

WARREN G. BILLÉ.